Nov. 17, 1959 G. H. SMITH 2,913,036
PROCESS AND APPARATUS FOR MOLDING
LARGE PLASTIC STRUCTURES
Filed Aug. 10, 1956 2 Sheets-Sheet 1

GEORGE H. SMITH
INVENTOR.

BY
ATTORNEY.

Nov. 17, 1959 G. H. SMITH 2,913,036
PROCESS AND APPARATUS FOR MOLDING
LARGE PLASTIC STRUCTURES
Filed Aug. 10, 1956 2 Sheets-Sheet 2
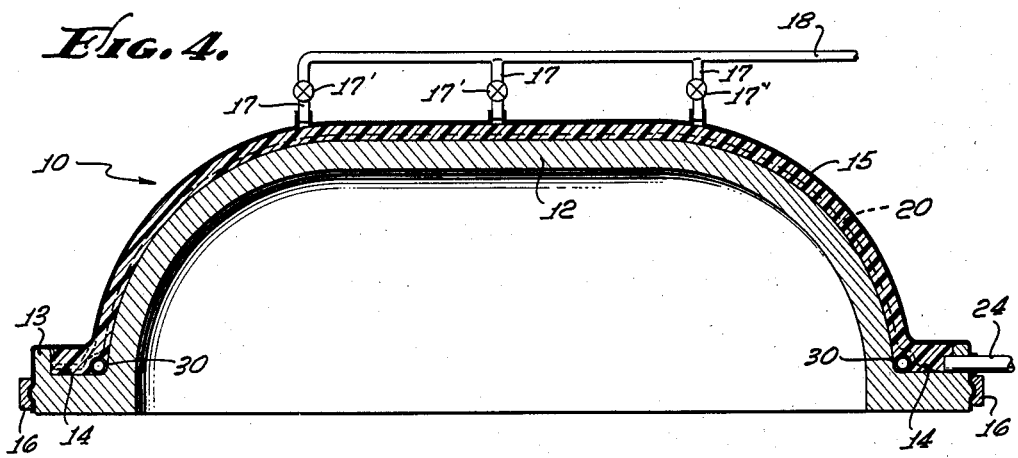
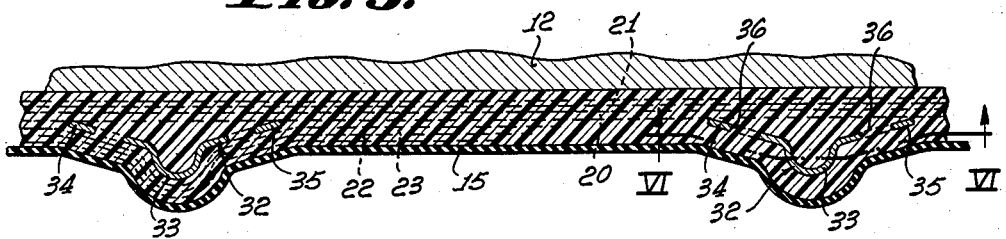
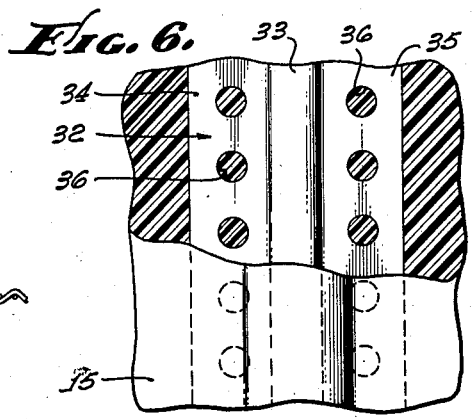
GEORGE H. SMITH
INVENTOR.
BY
ATTORNEY.

2,913,036

PROCESS AND APPARATUS FOR MOLDING LARGE PLASTIC STRUCTURES

George H. Smith, Lawndale, Calif., assignor to Anthony Bros. Fibre Glass Pool Corporation, South Gate, Calif., a corporation of California Application August 10, 1956, Serial No. 603,330

11 Claims. (Cl. 154—1.6)

This invention relates to the casting or molding of articles of plastic or similar materials, and more particularly to methods, apparatus, and products involved in the production of relatively large structures, such as swimming pools, tanks or tank sections and the like, made of such materials.

The general object of the invention is the provision of a novel and improved method of casting or molding such large articles or structures, whereby the flow of fluent plastic material is promoted throughout the mold, especially in cases where porous or permeable reinforcing material is employed, such as woven or felted fiberglass, or the like, and homogeneous articles are obtained. Attendant aims and purposes of the invention are to provide a novel and inexpensive casting apparatus and mold, and novel cooperating elements which may form a part of the finished product, while at the same time serving as a functional feature facilitating the casting or molding operation.

Injection molding is limited to small articles; pressure forming of shaped articles from sheet plastic composition is limited to size of available sheet and requires heat and pressure. Pressure molding from blanks of resinous composition is generally of utility in the manufacture of small articles, such as cups or plates, and is limited to thermosetting compositions such as melamine resins. Larger objects, such as a five hundred gallon tank, would require a fantastically large and impractical press.

It is also to be remembered that in order to develop maximum strength and homogeneity, islands or dry spots, air pockets and voids must be absent and an excess of binding resin should not be present. A laminate containing fibrous reinforcing should only contain sufficient resin to bond the fibers of the reinforcement. Since many sheet-like reinforcements are loosely woven or even in the form of loosely felted mats, it is desirable to compress such laminated objects during manufacture to inhibit the presence of excess resin. The use of two spaced, well machined, rigid and mating mold parts capable of compressing a loose and porous reinforcing is not feasible since it is not possible to impregnate the reinforcing without the use of very high pressures and the flow of resin tends to disturb and carry away portions of the fibrous reinforcing.

The manufacture of reinforced plastic shells by layering woven fabrics over a mold and spraying or painting each layer with a resinous composition is time-consuming, laborious and not adapted to the production of large articles of a homogeneous structure. Drawing of the resin up through the matrix space and through the fibrous reinforcement material causes the filaments of the fibrous material to wash or flow with the resin and as the distance of flow increases, they eventually form dams and block the flow of resin at various points. Non-homogeneous articles are thus produced.

The present invention, in its preferred embodiment, contemplates the provision in a vacuum envelope or other system of casting large plastic structures, a network of veins or arteries extending throughout the area of the mold space, through which the fluent plastic may readily flow to many strategic points from which the material may seep to every part of the space to be filled. Preferably, the arteries are foraminous or ported so that the seepage or distribution of material may occur throughout the length of the arteries, and the arteries are arranged in a network or reticulated, whereby spaces intervening between arteries will be approximately equal so that the whole area of the mold can be rapidly, expeditiously and substantially evenly filled, curable plastic or resinous material spreading by seepage from the arteries through the restricted subdivisions of porous reinforcing fabric almost as rapidly as the material rises through the arteries themselves.

The skeletonized arteries are preferably made of relatively rigid material in order to withstand pressure without collapsing. One suggested example of a device available for this purpose is an elongated member resembling a plasterer's bead having foraminous outwardly extending side portions. Such members may be covered with permeable material or they may be embedded between layers of fabric reinforcing material in the molded articles. In the latter case, the arteries themselves become a part of the final casting and appear usually in the forms of reinforcing ribs. Otherwise, if the arteries are not to be embedded in the final product, they may be left uncovered or only lightly covered upon the outside of the fabric and then after the casting is hardened the artery structure may be broken away and discarded.

Certain of the advantages of the practice of the present invention over systems now employed may be mentioned. The use of a single rigid mold instead of two, accurately spaced or mating rigid molds is a decided advantage. The springy, compressible, fibrous reinforcing material is placed over the prepared surface of the rigid mold part and then the relatively thin, flexible, elastic bag or envelope is sealed to the lower margins of the rigid mold. When the air is evacuated at the top from between the mold and the bag, the bag collapses against the fibrous reinforcement and forces it to follow the contours of the rigid mold. Thus it compresses the fibrous reinforcement to the minimum thickness against the surface of the mold and prevents the fibers from being displaced or washed away by the flow of the resin. Furthermore, only sufficient resin will remain in the reinforcing mat or web to adequately wet and bond the fibers and fill the voids. Under external atmospheric pressure (when the vacuum is applied internally), the bag acts as a large fluid press member equally distributing the pressure over the entire surface of material on the mold.

The amount of resin and rate of flow through the fibrous reinforcement can be controlled by the manipulation of the vacuum. Desirably the plastic bag is transparent so that the flow of resin may be observed during the casting process.

It is desirable to provide a circumferential supply trough at the base of the mold (corresponding to the lip of a large vessel or object being formed) to facilitate distribution of the impregnating resinous composition to all portions of the mold. The bag may be sealed about the trough at the base of the mold and as the vacuum is applied, the bag may be caused to press upon the resin in the trough and force it up and into the reinforcement ultimately impregnating and filling all of the voids throughout the entire structure, all surplus resin being squeezed out and a good, void-free, homogeneous laminate provided.

Other objects and features of novelty will be apparent from the following specification when read in connection with the accompanying drawings, in which one embodiment of the invention is illustrated by way of example.

In the drawings:

Fig. 4 is a similar view on a somewhat enlarged scale, showing the arrangement when the casting is completed, and omitting the air-actuated release means.

Fig. 5 is a fragmentary, horizontal, sectional view taken on line V—V of Fig. 1 with the casting operation complete, at least up to the level of the section line.

Fig. 6 is a fragmentary, sectional view taken on line VI—VI of Fig. 5.

Fig. 7 is an enlarged end view of a portion of a modified form of conduit.

Figure 1:
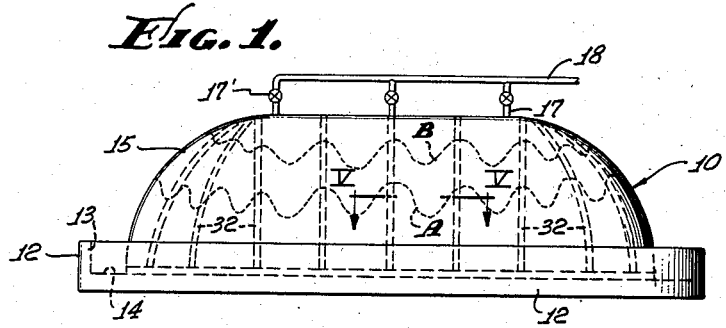
Fig. 1 is a view in side elevation and somewhat diagrammatic as to details, of a molding installation for casting hollow structures such as basins or pools in accordance with the principles of the invention.
Figure 2:
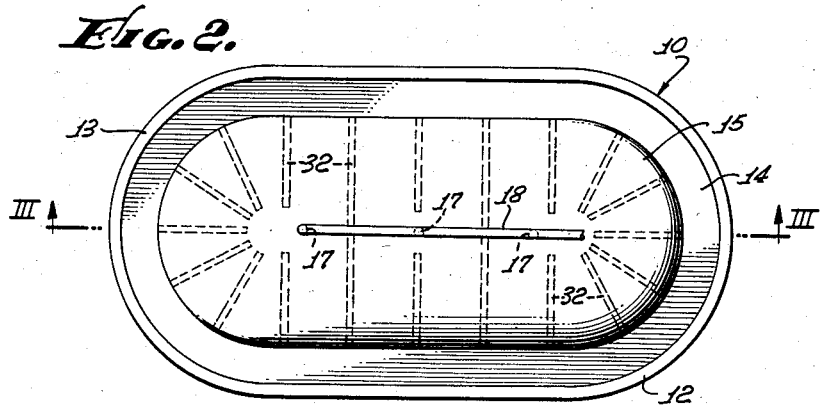
Fig. 2 is a top plan view of the assembly shown in Fig. 1.

In the drawings, the mold assembly is indicated generally by the reference character 10 and, in the exemplary embodiment shown, it is intended for the casting of a large hollow structure, such as a swimming pool. For simplicity of schematic illustration and description, the embodiment chosen is a small pool of uniform depth, but the design can be varied widely in width, plan contour and depth. For example, it may have a shallow wading section at one end and a deeper section of graduated vertical dimension at the other end; it may be wider at one end than at the other, etc.

The mold part 12 is preferably a rigid member which can be made of plaster or other cementitious compositions, rigid preformed plastic compositions, concrete or a strong core provided with a smooth outer surface of desired configuration, upon which surface the hollow, relatively thin-walled, reinforced plastic object is to be cast. This mold part 12 is shown provided with upstanding bottom flanges 13 defining a circumferential trough 14 extending around the mold. A preformed envelope or bag 15 approximately shaped to the configuration of the structure to be cast is also provided, such envelope being made of a rubber or synthetic rubber composition or sheet plastic material having desired properties of resiliency, conformability under pressure, impermeability, flexibility and elasticity. The envelope 15 is removably attached to flange 13 by suitable means such as clamping ring 16 to provide an air-tight joint at such flange. At appropriate high points the envelope is provided with vacuum line connections 17 leading through valves 17' to a source of vacuum by line 18.

A plastic structure of large size must be properly reinforced in order to maintain its shape and prevent fracture. The surface of mold 12 is therefore covered with a reinforcing fabric (which may comprise one or more laminae 20 of a permeable or porous fabric, such as fiberglass, either woven or felted) before the envelope or bag 15 is attached.

A suitable fluent or liquid resinous material or plastic composition is supplied to the trough 14 from the tank 19 and pipe 24 by pump 25, a valve 26 being provided between the pump and the trough. Such fluent plastic composition is used to impregnate layers of fibrous reinforcing laid upon the external surface of mold part 12.

When the vacuum is turned on, the reduced pressure within the envelope or bag raises the plastic from the trough up through the space between the rigid mold part and the bag and at the same time the air is evacuated from the fibrous reinforcing material. Also, the atmospheric pressure against the lower portion of the bag forces the resin from the trough 14 up through the mold space.

Now, if these plain laminae of reinforcing fabric were employed alone, the pores thereof would become clogged with the liquid plastic in very short order and at most, the material could only rise to a height of approximately twenty-four inches around the mold. The impregnation would also be extremely uneven and irregular with numerous alternating voids and concentrations of plastic.

It is to be remembered that a swimming pool, tank, or other large object being cast may be ten to thirty feet long (or in diameter) and have a height or depth as great as six or eight feet. It is often desirable to include structural reinforcing elements into such structure in addition to the fibrous reinforcing. The arteries or distribution veins employed in the method of this invention not only insure uniform distribution of resin or plastic throughout the porous reinforcing but also act as structural reinforcing members.

In the case of a swimming pool, as an example, the entire surface of the mold part 12, including the bottom of the trough 14, may be first covered by one or more layers 20 and 21 of fiberglass mat, loosely felted, springy and porous, or by a layer of woven fabric-like reinforcing material. Fabrics or mats of glass or mineral fibers are preferred to organic fibers because of their durability and strength. Such initial layer may be about 0.1 inch to 0.3 inch thick, but can be considerably thicker if desired. A distribution conduit 30 may be provided if desired, extending peripherally around the mold part 12 on the layer 20 in order to facilitate passage of impregnating resin to all points at the base of the mold. Conduit 30 desirably consists of an elongated, hollow member sufficiently flexible to follow the contour of the base of the mold part, and strong enough to withstand the collapsing force of atmospheric pressure when the vacuum is applied.

Additional porous, foraminous, hollow conduits 32 are then arranged in spaced relation over the initial layer or layers of fibrous mat over the surface of mold 12, the lower ends of most of such conduits 32 being adjacent conduit 30; the upper ends may terminate near the top of the mold or some of the conduits 32 may extend completely over the top of the mold, both ends of such conduits being adjacent the main distribution conduit 30. When such distribution conduits 32 are to be an integral part of a finished object, their placement and spacing depends upon the shape and use of the object and the structural reinforcing effect desired. The spacing of conduits 32 should not be so great as to preclude ready dissemination of fluid plastic to fibrous reinforcing between conduits. These distribution conduits 32 are exemplarily shown in Figs. 5 and 6 in the form of preformed strips having a centrally disposed, longitudinally extending rounded rib portion 33 which is outwardly convex and integral flanking lateral portions 34 and 35 provided with longitudinally spaced ports 36 formed therein. These combined reinforcing and distribution conduits may be formed of strip metal or other material and are sufficiently flexible, bendable or conformable to be caused to follow and conform to the contours of the mold 12. The ports 36 may be located as shown or comprise notches in the edge portions of lateral wings 34 and 35. Instead of metal, similar foraminous conduits of substantially semi-circular cross-section, with or without lateral seating flanges may be made of wire mesh or open mesh fiberglass fabric treated with a plastic. Two-piece conduits, as shown in Fig. 7, comprising a half round bead 37 in a strip 38 of wire mesh with the side flanges of such strip stapled to another flat strip 39 of wire mesh have been successfully used, the flat base strip being then applied to the underlying layer of fibrous mat.

In cases where the finished article is to retain the arterial system as a part of its structure (and this is of great advantage where extra reinforcement is desired), the arteries are disposed between laminae of reinforcement, for example, as shown in Fig. 5 of the drawings, where the principal laminae of reinforcing fabric are indicated at 20 and 21 and lie beneath the artery skeletons 32, and a superposed series of laminae 22 and 23 are disposed exteriorly of the arteries. Certain of such laminae may be mats which have been preliminarily sprayed with a resin or plastic composition compatible with the plastic composition used in impregnating the structure.

It is to be understood that a suitable parting compound is normally applied to the surface of mold 12 before the reinforcing fibrous mats are applied, and that the various conduits may be stapled or otherwise attached to the mats as they are applied, to hold them in position. After all of the mats, fibrous sheets and conduits are in place, envelope 15 is lowered over the prepared mold (the inner surface of the envelope being properly treated with a parting compound) and the lip of envelope 15 clamped to flange 13 of the mold. Fluid plastic composition is then supplied to the trough 14 by pump 25 and distributed to all bottom portions of the mold. Vacuum is then applied to the upper portions of the assembly by line 18 and valved suction lines 17, the suction withdrawing occluded air from the fibrous reinforcing and permitting the plastic solution to displace such air and completely impregnate the mats and fabric. Simultaneously, the flexible envelope 15 will, under the influence of internal subatmospheric pressure and external atmospheric pressure, compress the reinforcing fabric and mats. Plastic not only flows upwardly through conduits 32 but also flows laterally through the walls of such conduits to completely impregnate the fabric and mat reinforcing. The spread of the plastic material occurs as suggested by the broken lines A and B of Fig. 1. About the half-way point of the casting operation, the flow of material upwardly and laterally throughout the mold space shows a marginal line such as indicated at A where the advance through the arteries 32 is indicated by the upwardly projecting nodes, and the slower lateral seepage will be indicated as filling the space between the arteries in accordance with the depending nodes of the line A. The line B indicates a further stage of progress and it will be readily understood how the entire mold fills evenly and expeditiously in the manner described until the plastic reaches the vacuum lines 17. Supply of plastic by pump 25 is then discontinued, but suction can be maintained for some time during curing and setting of the resin. Vacuum line 18 may be side connected to tank 19 to permit return of excess plastic or resinous composition to such tank, such arrangement de-airing and de-gassing the resin and providing a closed system.

Perfect control of the process by the operator is assured, by virtue of the visibility of the flow of plastic through a transparent envelope or bag when such is used, and the ability of the operator to vary the progress of the processes by manipulation of the vacuum controls. The fibrous reinforcement material is naturally of a springy nature and with either no pressure exerted or with slight pressure, the material remains open and this will expedite the flow of resin. As the vacuum is increased and a greater effect of the atmospheric pressure exerted, the fibrous material will be compressed and surplus resin squeezed out. Also, by relaxing the pressure when deemed advisable, the fibrous material will tend to spring open somewhat and allow more resin to flow through it. Thus, by judicious manipulation of the vacuum with the flexible bag acting as a pressure diaphragm, the amount and flow of the resin can be controlled as well as the height to which the resin is raised in the mold, the flow either being held at a given height if desired and moved at a given rate of speed.

The arrangement and size of the rotary system and the resulting reinforcing rib framework is such that one end of the panel between such ribs is always open to allow the complete evacuation of air and the replacement thereof and impregnation of the reinforcement by the resin. Thus, by the use of this method no unevacuated or unimpregnated areas can develop.

Various self-curing or hardening resinous compositions may be used, polyester resins or mixtures being particularly well adapted for use in the process. Resinous compositions including epoxy-type resins can also be employed. In the event some heat is desired to expedite curing, the mold 12 can be provided with heating coils embedded near the surface of the mold, or after the envelope is removed, the entire mold may be rolled into a curing or drying oven and exposed to infrared or other source of heat for a short period of time. Due to the great variety of resins available, no specific resins or resin compositions are here given, those skilled in the art being capable of selecting the resins, curing agents, plasticizers, solvents, etc. and their proportions to produce the desired results.

Figure 3:
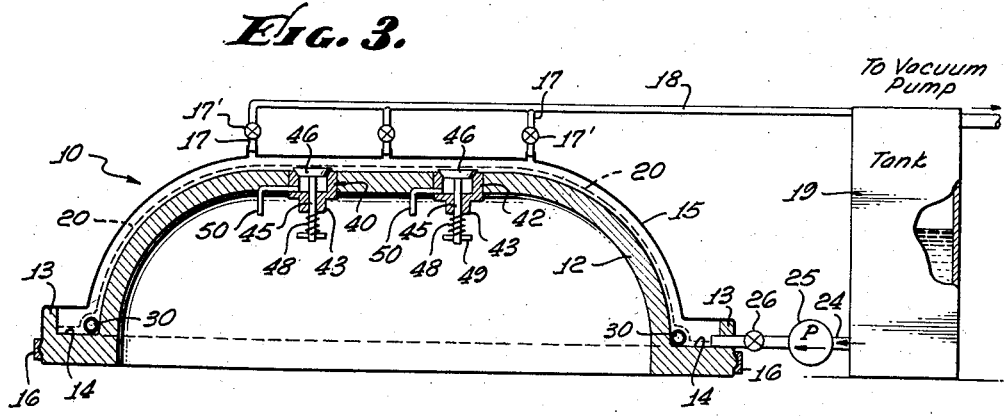
Fig. 3 is a longitudinal, vertical, sectional view, in somewhat more detail, of the assembly and taken on line III—III of Fig. 2, this view showing the parts in their condition before suction is applied and with certain accessory features added in diagrammatic elevation.

After the swimming pool, tank or other large object so made has cured and hardened, the clamp at the base of envelope 15 is removed and the lip of the envelope 15 peeled up and off flange 13, permitting the envelope to be removed. Air may also be admitted by valves 17', line 18 being now open to atmosphere. In order to facilitate removal of the cast structural object of swimming pool from mold 12, one or more release valves 40 are provided as shown in Fig. 3 of the drawings but omitted for the sake of clearness from the other figures. Each valve 40 comprises a valve body 42 having an extended portion 43 through which the valve stem 45 depends, the stem being fixed to the valve 46 which seats at the mouth at the upper end of the body 42. The valve is urged toward seating position by means of the coil spring 48 which surrounds the stem and bears between the abutment 49 carried by the stem and the surface of the extended portion 43 of the valve body. A pipe 50 extends from an opening in the valve body to a source of compressed air, and when the casting operation is completed the compressed air is allowed to flow through the pipe 50 and unseat valve 46 and thus facilitate separation between mold 12 and the cast object. The exemplary swimming pool must be inverted and set into a suitable depression in the ground in order to be ready for use. It may be noted that such pool (or tank) can be formed integrally with a lip (on the bottom of trough 14) which facilitates connection to other members, and drain outlets, fittings, and other elements may be integrally formed and bonded to the structure during forming.

It is understood that various changes and modifications may be made in the configuration, composition and structural arrangement of the features described without departing from the scope of the invention as defined by the following claims.

I claim:

1. A process of molding a plastic structure provided with a concave inner surface terminating at a circumferential lip, which comprises: providing a generally convex mold surface extending upwardly from a flat base; applying porous, impregnatable, fibrous, reinforcing sheet material to said mold surface; arranging a series of circumferentially spaced, hollow, laterally ported, distribution channels extending upwardly from the base of the mold upon the fibrous reinforcing; covering the assembly with an impervious, flexible envelope; sealing said envelope to the base of the mold; establishing a supply of liquid, curable, resinous composition within the envelope at the base of the mold and applying vacuum to within the top portion of the envelope to move said resinous composition upwardly through said distribution channels and fibrous reinforcing while atmospheric pressure externally of said envelope compresses said reinforcing, to homogeneously impregnate said fibrous reinforcing with said resinous composition and bond said resinous composition and distribution channels into a unitary plastic structure.

2. A process of molding plastic structures or the like, which comprises: establishing complementary mold parts enveloping the casting space; disposing a porous, impregnatable, reinforcing medium within the casting space; establishing conduits within said space and adjacent said medium for the rapid and relatively unimpeded distribution of fluent plastic material to a plurality of points throughout the space, from whence seepage of the material through the porous medium insures the expeditious impregnation of the medium and filling of the casting space; introducing fluent plastic material into said casting space; and removing the resulting cast structure from the mold when it has hardened.

3. A process of molding plastic structures or the like, which comprises: establishing complementary mold parts enveloping the casting space; disposing a porous, impregnatable reinforcing medium within the casting space; disposing foraminous, hollow elements within the casting space and adjacent said medium to provide conduits for the rapid and relatively unimpeded distribution of fluent plastic material to a multiplicity of points along said foraminous, hollow elements, from whence seepage of the material through the adjacent areas of porous reinforcing medium insures the expeditious impregnation of the medium and filling of the casting space; introducing fluent plastic material into said casting space by differential pressure; and removing the resulting cast structure from the mold when it has hardened.

4. A process of molding plastic structures or the like, which comprises: establishing complementary mold parts enveloping the casting space; disposing a porous, impregnatable, reinforcing medium within the casting space; embedding in said porous medium within said casting space a network of foraminous, hollow elements to provide unobstructed conduits for the rapid and relatively unimpeded distribution of fluent plastic material to a multiplicity of points throughout the casting space from which seepage of the material from said network through the intervening areas of porous medium insures the expeditious impregnation of the medium and filling of the casting space; sucking fluent plastic material into said casting space; and removing the resulting cast structure from the mold when it has hardened.

5. A process of molding plastic structures or the like, which comprises: establishing complementary mold parts enveloping the casting space; disposing a porous, impregnatable reinforcing medium substantially throughout the casting space; establishing a pool of fluent plastic material along the lowest portion of said casting space; disposing substantially vertically arranged, horizontally spaced, foraminous, hollow conduits within said space and adjacent said porous medium and with the lower ends of the conduits in communication with said pool; causing said fluent material to rise through said conduits and at the same time seep laterally from the conduits through the intervening areas of porous, reinforcing medium to insure the expeditious impregnation of the medium and filling of the casting space by establishing partial vacuum at the top portion of the casting space; and removing the cast structure from the mold after it has hardened.

6. A process of molding plastic structures or the like, which comprises: establishing a basic mold part against a surface of which the structure is to be cast; applying at least one lamina of porous, impregnatable, reinforcing medium to the surface of the mold part; establishing a gutter at the base of said mold part for the reception of fluent plastic material; disposing a plurality of foraminous, hollow conduits in proximity to said porous medium with their lower ends in communication with said gutter; covering the mold surface and its above-recited applied elements with a flexible, impervious envelope; supplying fluent, curable plastic material to said gutter; evacuating said envelope space until the casting space is filled; and after the resulting cast structure has hardened, breaking the vacuum beneath the envelope and removing the structure.

7. A process of molding plastic structures or the like, which comprises: establishing a basic mold part against a surface of which the structure is to be cast; applying at least one lamina of porous, impregnatable reinforcing medium to the surface of the mold part; establishing a gutter at the base of said mold part for the reception of fluent, plastic material; disposing a plurality of foraminous conduits in proximity to said porous medium with their lower ends in communication with said gutter; covering the mold surface and its above-recited applied elements and also said gutter with a flexible envelope; supplying fluent, plastic material to said gutter; evacuating said enveloped space so that the external atmospheric pressure causes the envelope to press against the plastic in the gutter and within the reinforcement-filled mold space, and causes the fluid plastic to move from the gutter through the conduits impregnating the reinforcement completely and ejecting excess plastic from the mold space and the conduits; and after the resulting cast structure has hardened, breaking the vacuum beneath the envelope and removing the structure.

8. Casting apparatus for forming plastic structures or the like, comprising, in combination: a basic mold part and a complementary mold part enclosing a casting space, at least one lamina of porous medium within said space; a plurality of foraminous conduits within the casting space and adjacent said porous lamina through which fluent plastic material may flow relatively freely to points distributed throughout said space and from thence impregnate the porous medium; means for supplying fluent plastic material to the lower portion of the casting space; and means for evacuating the casting space.

9. Casting apparatus for forming plastic structures or the like, comprising, in combination, a basic mold part and a flexible, impervious envelope forming a complementary mold part enclosing a casting space, at least one lamina of porous medium within said space; a plurality of upwardly extending, foraminous, hollow conduits within the casting space and adjacent said porous lamina through which fluent plastic material flows relatively freely to points distributed throughout said space and from thence impregnate the porous medium; means for supplying fluent plastic material to the lower portions of the conduits in said casting space; and means for applying vacuum to the upper portion of the casting space.

10. A process of molding a plastic structure provided with a concave inner surface terminating at a circumferential lip, which comprises: providing a generally convex mold surface extending upwardly from a flat base; applying porous, impregnatable, fibrous, reinforcing sheet material to said mold surface; arranging a series of liquid impregnating resin composition distribution paths having lateral seepage arteries upwardly from the base of the mold upon the fibrous reinforcing; covering the assembly with an impervious, flexible envelope; sealing said envelope to the base of the mold; establishing a supply of liquid, curable, resinous composition within the envelope at the base of the mold and applying vacuum to within the top portion of the envelope to move said resinous composition upwardly through said distribution paths and arteries and fibrous reinforcing while atmospheric pressure externally of said envelope compresses said reinforcing, to homogeneously impregnate said fibrous reinforcing with said resinous composition and bond said resinous composition, distribution paths and arteries into a unitary plastic structure.

11. A process of molding a plastic structure provided with a concave inner surface terminating at a circumferential lip, which comprises: providing a generally convex mold surface extending upwardly from a flat base; applying porous, impregnatable, fibrous, reinforcing sheet material to said mold surface; establishing a plurality of paths for liquid composition flow and substantially preventing entry into said paths of portions of the reinforcing; covering the assembly with an impervious, flexible envelope; sealing said envelope to the base of the mold; establishing a supply of liquid, curable, resinous composition within the envelope at the base of the mold and applying vacuum to within the top portion of the envelope to move said resinous composition upwardly through said distribution paths and arteries and fibrous reinforcing while atmospheric pressure externally of said envelope compresses said reinforcing, to homogeneously impregnate said fibrous reinforcing with said resinous composition and bond said resinous composition, distribution paths and arteries into a unitary plastic structure.

References Cited in the file of this patent

UNITED STATES PATENTS

| | | |
|---|---|---|
| 2,428,654 | Collins | Oct. 7, 1947 |
| 2,495,640 | Muskat | Jan. 24, 1950 |
| 2,534,617 | Mohrman | Dec. 19, 1950 |
| 2,747,180 | Brucker | May 22, 1956 |
| 2,748,045 | Kelly | May 29, 1956 |
| 2,755,216 | Lemons | July 17, 1956 |
| 2,802,766 | Leverenz | Aug. 13, 1957 |
| 2,805,974 | Brucker | Sept. 10, 1957 |
| 2,815,309 | De Ganahl et al. | Dec. 3, 1957 |

FOREIGN PATENTS

| | | |
|---|---|---|
| 672,144 | Great Britain | May 14, 1952 |